United States Patent
Santoso et al.

(10) Patent No.: US 11,125,051 B2
(45) Date of Patent: Sep. 21, 2021

(54) HIGH STRENGTH HIGH TEMPERATURE FLOAT EQUIPMENT

(71) Applicant: Halliburton Energy Services, Inc., Houston, TX (US)

(72) Inventors: Handoko Tirto Santoso, Houston, TX (US); Paul Joseph Jones, Houston, TX (US); Simon Turton, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 16/696,345

(22) Filed: Nov. 26, 2019

(65) Prior Publication Data

US 2021/0156224 A1    May 27, 2021

(51) Int. Cl.
| | |
|---|---|
| *E21B 34/06* | (2006.01) |
| *E21B 33/14* | (2006.01) |
| *C04B 28/04* | (2006.01) |
| *C04B 14/06* | (2006.01) |
| *C09K 8/467* | (2006.01) |
| *C04B 103/40* | (2006.01) |

(52) U.S. Cl.
CPC .............. *E21B 34/06* (2013.01); *C04B 14/06* (2013.01); *C04B 28/04* (2013.01); *C09K 8/467* (2013.01); *E21B 33/14* (2013.01); *C04B 2103/408* (2013.01)

(58) Field of Classification Search
CPC .......... E21B 34/06; E21B 33/14; C09K 8/467
USPC ....................................................... 166/292
See application file for complete search history.

(56) References Cited

U.S. PATENT DOCUMENTS

| | | | | |
|---|---|---|---|---|
| 4,002,483 | A | * | 1/1977 | Daugherty ................ C04B 7/02 106/713 |
| 4,413,682 | A | | 11/1983 | Callihan et al. |
| 4,797,159 | A | | 1/1989 | Spangle |
| 5,351,759 | A | * | 10/1994 | Nahm ...................... C09K 8/46 166/293 |
| 5,472,053 | A | * | 12/1995 | Sullaway ................ E21B 34/06 166/327 |

(Continued)

FOREIGN PATENT DOCUMENTS

WO    2012174251 A2    12/2012

OTHER PUBLICATIONS

Foreign Communication from Related Application—International Search Report and Written Opinion of the International Searching Authority, International Application No. PCT/US2019/063365, dated Aug. 20, 2020, 18 pages.

*Primary Examiner* — Zakiya W Bates
*Assistant Examiner* — Ashish K Varma
(74) *Attorney, Agent, or Firm* — Conley Rose, P.C.; Rodney B. Carroll (57) ABSTRACT

A downhole tool comprising a cylindrical housing, a sleeve disposed in the cylindrical housing, forming an annular space between the sleeve and the cylindrical housing, and a tool cement composition disposed in the annular space, wherein prior to setting the tool cement composition comprises a cement, sand, a silicon-containing material, a dispersant, and water, and wherein upon setting the tool cement composition provides an annular seal having a fluid leakage of less than 750 ml over 15 minutes at a pressure of 7500 psi and a temperature of 400° F.

20 Claims, 9 Drawing Sheets

(56) References Cited

U.S. PATENT DOCUMENTS

2014/0048267 A1\* 2/2014 Pisklak ................ C04B 28/18
  166/292
2017/0008810 A1   1/2017 Rademan et al.
2017/0254173 A1\* 9/2017 Downey ................ E21B 33/14

\* cited by examiner

HIGH STRENGTH HIGH TEMPERATURE FLOAT EQUIPMENT

BACKGROUND

This disclosure relates to a downhole tool and methods of making and using same. More specifically, it relates to float equipment that can be used when running and cementing casing in a wellbore penetrating a subterranean formation.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus.

Float equipment is often used during running casing and primary cementing. Float equipment can be a float collar, a float shoe, a landing collar, etc. Float equipment can help to reduce strain on the derrick while guiding casing past ledges and slough zones in the hole, to provide a landing point for bottom and top cementing plugs (pumped ahead of and behind the cement slurry as part of cementing operations), and/or to provide a backpressure valve to prevent cement from flowing back into the inner diameter of the casing after the cement has turned the corner into the annulus and the top plug has been bumped. Float equipment often includes a cement body as a part of a seal to hold a differential pressure above and below the float equipment. The differential pressure can be above 5000 psi, and the downhole temperature can also be up to 400° F. Steel casing (e.g., a cylindrical housing, a sleeve) of float equipment can be made from steel and may have a higher thermal coefficient expansion than the cement body when exposed to high temperature. The difference in the thermal expansion coefficient of the materials of construction of the float equipment may cause leakage at the interface between the cement body and the steel casing (e.g., a cylindrical housing, a sleeve) when exposed to elevated temperatures. In addition, Portland cement may experience strength retrogression at temperatures above 230° F. if not properly designed.

Accordingly, a need exists for float equipment that maintains high strength at high temperature and high pressure.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down". For example, in a horizontal wellbore, two locations may be at the same level (i.e., depth within a subterranean formation), the location closer to the well surface (by comparing the lengths along the wellbore from the wellbore surface to the locations) is referred to as "above" the other location.

Figure 1:
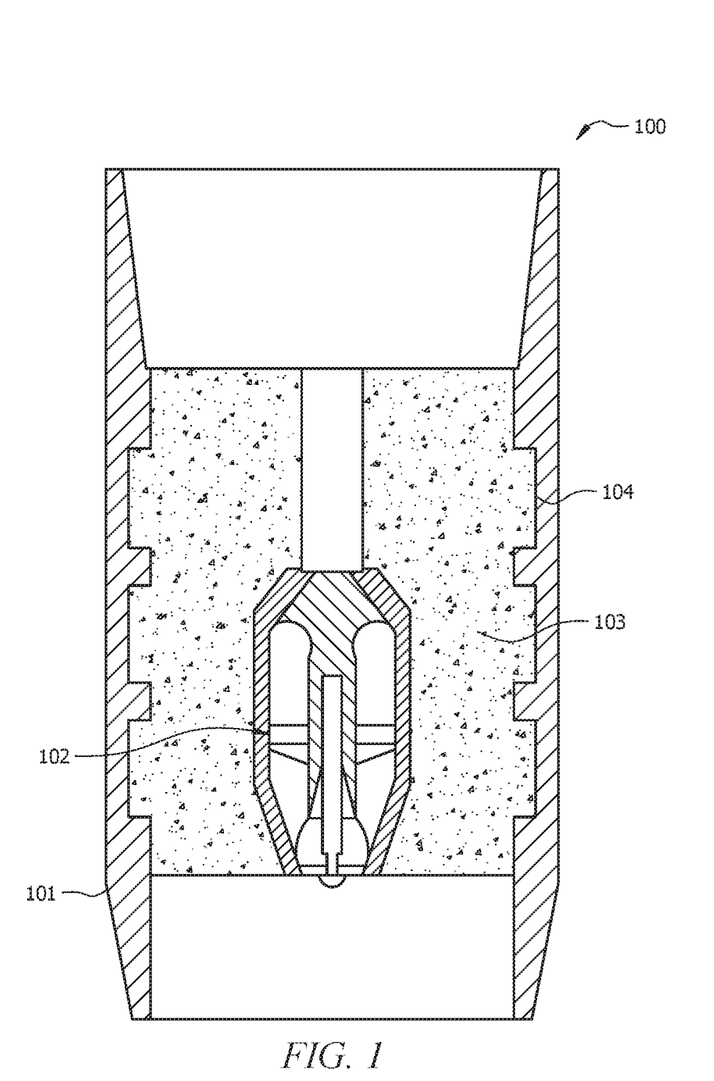
FIG. 1 is a cross-sectional view of a downhole tool 100 that comprises a float collar.
Figure 2:
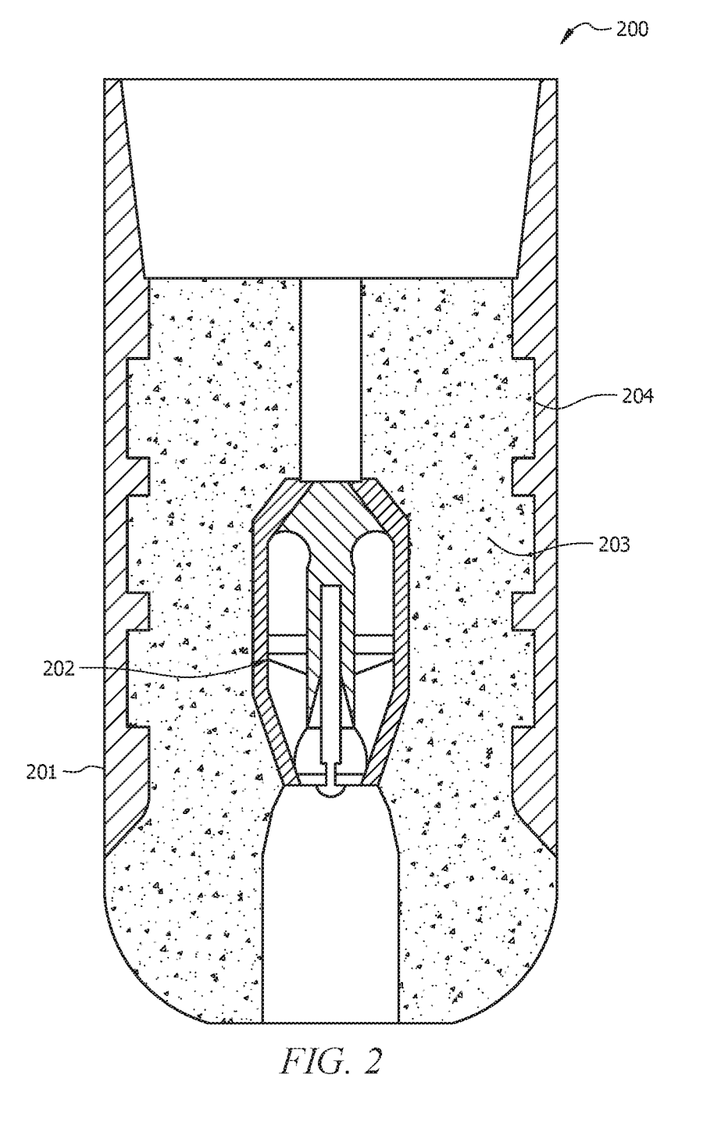
FIG. 2 is a cross-sectional view of a downhole tool 200 that comprises a float shoe.
Figure 3:
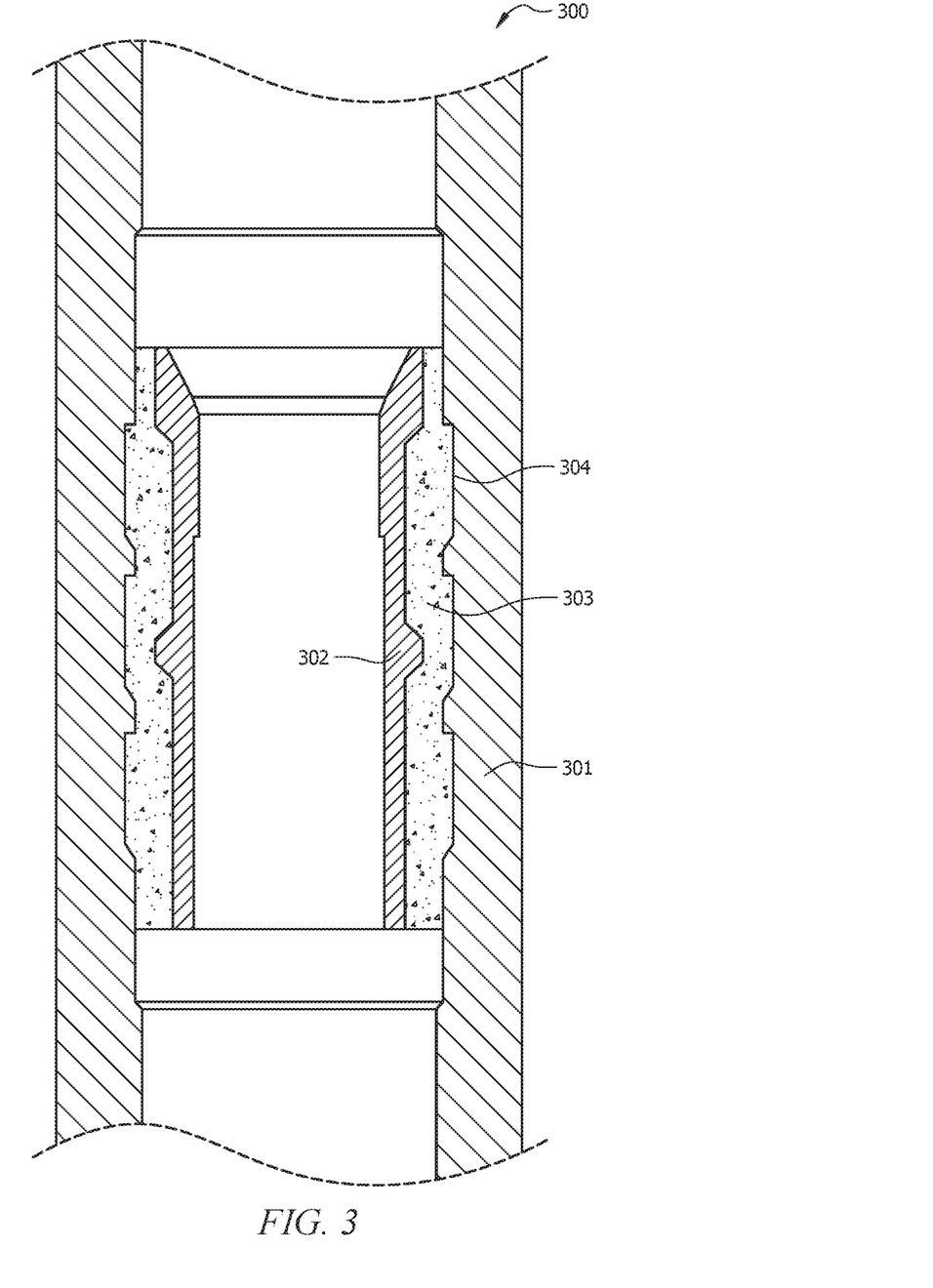
FIG. 3 is a cross-sectional view of a downhole tool 300 that comprises a landing collar.

Disclosed herein is a downhole tool and methods of making and using same. As shown in FIGS. 1-3, the downhole tool 100 (e.g., a float collar), 200 (e.g., a float shoe), and 300 (e.g., a landing collar), respectively, can comprise: a cylindrical housing 101, 201, and 301, respectively; a sleeve 102, 202, and 302, respectively disposed in the cylindrical housing 101, 201, and 301, forming an annular space between the sleeve 102, 202, and 302 and the cylindrical housing 101, 201, and 301; and a tool cement composition 103, 203, and 303, respectively disposed in the annular space, wherein prior to setting the tool cement composition 103, 203, and 303 comprises a cement, sand, a silicon-containing material, a dispersant, and water, and wherein upon setting the tool cement composition 103, 203, and 303 provides an annular seal having a fluid leakage of less than 750 ml over 15 minutes at a pressure of 7500 psi and a temperature of 400° F.

The cylindrical housing 101, 201, and 301 of the downhole tool 100, 200, and 300 can comprise steel. The steel can be high carbon steel, chromium steel, vanadium steel, or the like. The cylindrical housing 101, 201, and 301 can be made from other materials, e.g., suitable alloys. One or both ends of the cylindrical housing 101, 201, and 301 can be each coupled to a casing pipe, for example, via treads at one or both ends of the cylindrical housing 101, 201, and 301. The preferred sizes of the cylindrical housing (and associated one or two casing pipes) can be from a diameter of about 4½ inches to about 22 inches, alternatively from about 4½ inches to about 16 inches, alternatively from about 4½ inches to about 9⅝ inches. As in FIGS. 1-3, the inner surface of the cylindrical housing 101, 201, and 301 comprises one or more ribs, wedges, indentations, or combinations thereof (104, 204, and 304, respectively in FIGS. 1-3) that aid resistance to axial movement of the annular seal formed by the tool cement composition 103, 203, and 303. The shapes of the one or more ribs, wedges, indentations, or combinations thereof (104, 204, and 304) can be square, round, helix, or any suitable shapes.

The sleeve 102, 202, and 302 of the downhole tool 100, 200, and 300 can comprise steel. The steel can be high carbon steel, chromium steel, vanadium steel, or the like. The sleeve 102, 202, and 302 can be made from other materials, e.g., composite materials phenolic and other compatible material for high temperature and high pressure application. The sleeve can be sized to fit within the inner diameter of the cylindrical housing and form the annular space configured to receive the tool cement composition and form the annular seal. The sleeve can be sized to fit within the inner diameter of the cylindrical housing (e.g., having a diameter of less than about 4½ inches to about 22 inches, e.g., a diameter in a range of from about 2 inches to about 8.5, 8, 7, 6, 5, 4, or 3 inches).

The sleeve 102 and 202 of the downhole tool 100 and 200, respectively can comprise a valve as in FIGS. 1-2, wherein the tool 100 and 200 comprises a float collar and a float shoe, respectively. FIG. 3 shows the tool 300 comprising a landing collar, which does not show a valve, but the sleeve 302 therein can also comprise a valve. The valve as disclosed herein can be a one-way valve which permits flow in a single direction. The valve can be any types of one-way valves, for example, a ball check valve, a diaphragm check valve, a swing check valve or tilting disc check valve, a stop-check valve, and a lift-check valve. In some embodiments, the single direction is from top to bottom or from an interior of the tool to an exterior of the tool. The valve is to avoid a fluid flow from the bottom to the top or from the exterior to the interior of the tool when using the tool. The fluid can be drilling fluid, cement fluid, or any other servicing fluid, and the valve can prevent a backflow of the such fluid from the an area outside the too (e.g., an annular space in the wellbore) back into an interior of the tool. At the beginning of an operation, the valve can be held at least partially open by a holding block (e.g., a bead) so that upward flow through the tool is temporally permitted. Once a fluid flows downward through the one way valve in the tool, the holding block is released and will not hold the valve open any more, thus the valve will only allow downward flow from then on.

The tool cement composition 103, 203, and 303 of the downhole tool 100, 200, and 300 can affix the sleeve 102, 202, and 302 with the cylindrical housing 101, 201, and 301. After setting, the tool cement composition 103, 203, and 303 can provide desired strength and sealing. The set tool cement composition 103, 203, and 303 can also be referred to as a "cement body" or an "annular seal" of the tool.

The tool cement composition of the downhole tool can comprise a cement. The cement can comprise ASTM type II cement. In some embodiments, the cement can comprise calcium, iron, aluminum, silicon, oxygen, hydrogen, sulfur, or combinations thereof. In embodiments, the cement can comprise Portland cement, pozzolana cement, gypsum cement, shale cement, acid/base cement, phosphate cement, high alumina content cement, slag cement, silica cement, high alkalinity cement, magnesia cement, or combinations thereof. Portland cements that are suited for use in the disclosed tool cement composition include, but are not limited to, Class A, C, G, H, low sulfate resistant cements, medium sulfate resistant cements, high sulfate resistant cements, or combinations thereof. The class A, C, G, and H cements are classified according to API Specification 10. The cement can be present in the tool cement composition in an amount 100 percent by weight of cement (% BWOC).

The tool cement composition of the downhole tool can comprise sand. The sand can comprise a naturally-occurring sand, a quartz sand, a glass sand, or combinations thereof. The sand can have a particle size of equal to or greater than about 0.0070 inches (80 mesh) and equal to or less than about 0.0331 inches (20 mesh). The sand that has a relatively large particle size (e.g., 20 mesh) can reduce the specific surface area of solid of the tool cement composition for easier mixing, and the sand that has a relatively small particle size (e.g., 40 mesh, 80 mesh) can help to increase the solubility rate of the silicon-containing material in the tool cement composition at high temperatures to stabilize strength against strength retrogression. The sand can be present in the tool cement composition in an amount of from about 60% BWOC to about 80% BWOC, alternatively from about 65% BWOC to about 80% BWOC, alternatively from about 70% BWOC to about 80% BWOC.

The tool cement composition of the downhole tool can comprise a silicon-containing material. The silicon-containing material serves as a silicon source in the tool cement composition and can be any powder material that contains silicon. The silicon-containing material can reduce and/or prevent the strength retrogression to the tool cement composition at a temperature equal to or higher than 230° F. During the hydration of cement, tri-calcium silicate ($C_3S$) and di-calcium silicate ($C_2S$) form calcium silicate hydrate (CSH) phase which gives strength to the cement. However, CSH is not thermodynamically stable; at a temperature equal to or higher than 230° F., CSH can convert to di-calcium silicate hydrate ($C_2SH$), which is denser than CSH. This can result in an increase in the pore space of a cement matrix formed by the hydration of cement, leading to an increase in permeability and a reduction in strength. By adding the silicon-containing material to the tool cement composition, the ratio of silicon to calcium in the tool cement composition is increased, which can reduce and/or prevent the formation of $C_2SH$, thus the shrinkage and the reduction in strength can be reduced and/or prevented.

The silicon-containing material can comprise silica flour, silica fume, fumed silica, micro fine silica, fly ash, pozzolan, zeolites, volcanic glass, powdered glass, perlite, pumice, natural glasses, synthetic glasses, metakaolin, or combinations thereof. Silica flour is a finely ground silica generally having a particle size of less than or equal to about 40 microns. Silica fume is a by-product of the manufacture of silicon or ferrosilicon, which involves subjecting quartz (when silicon is produced) or quartz and an iron-bearing material (when ferrosilicon is produced) to reduction with coke or coal and wood chips in a furnace. The silicon-containing material can have a particle size of equal to or less than about 0.0035 inches (170 mesh), alternatively of equal to or less than about 0.0029 inches (200 mesh). The silicon-containing material can be present in the tool cement composition in an amount of from about 20% BWOC to about 40% BWOC, alternatively from about 20% BWOC to about 30% BWOC, alternatively from about 25% BWOC to about 30% BWOC.

The tool cement composition of the downhole tool can comprise a dispersant. Examples of suitable dispersants include, but are not limited to sulfonated acetone formaldehyde condensate, naphthalene sulfonate, sodium naphthalene sulfonate, sodium acid pyrophosphate (SAPP), ammonium lignosulfonate salt, metal lignosulfonate salts, phosphates, polyphosphates, organophosphates, phosphonates, tannins, leonardite, polyacrylates having a molecular weight less than about 10,000, or combinations thereof. The dispersant can be present in the tool cement composition in an amount of from about 0.7% BWOC to about 1.5% BWOC, alternatively from about 0.7% BWOC to about 1.1% BWOC, alternatively from about 0.8% BWOC to about 1% BWOC.

The tool cement composition of the downhole tool can comprise water. The water can comprise water selected from a group consisting of freshwater, seawater, saltwater, brine (e.g., natural brine, formulated brine, etc.), and combinations thereof. The formulated brine may be produced by dissolving one or more soluble salts in water, a natural brine, or seawater. Representative soluble salts include the chloride, bromide, acetate, and formate salts of potassium, sodium, calcium, magnesium, and zinc. Generally, the water may be from any source, provided that it does not contain an amount of components that may undesirably affect the other components in the tool cement composition. The water can be present in the tool cement composition in an amount effective to provide a slurry having desired (e.g., job or service specific) rheological properties such as density, viscosity, gel strength, yield point, etc. The water can be present in the tool cement composition in an amount of from about 30% BWOC to about 40% BWOC, alternatively from about 32% BWOC to about 38% BWOC, alternatively from about 34% BWOC to about 36% BWOC.

The tool cement composition of the downhole tool can further comprise an expansion agent. The usage of the expansion agent expands the tool cement composition under high temperature, improving the bonding strength between the tool cement composition and the interior surface of the cylindrical housing, reducing fluid leakage of the annular seal formed by the set tool cement composition in the tool. The expansion agent may need to react with water to form a chemical that expands the tool cement composition under high temperature. The addition of the expansion agent also reduces or eliminates shrinkage during the curing process of the tool cement composition under ambient temperature and pressure. The expansion agent can comprise calcium aluminate, calcium sulfate, calcium sulfate hemihydrate, calcium sulfate dehydrate, high tricalcium aluminate Portland cement, magnesium oxide, potassium chloride, sodium chloride, potassium hydroxide, or combinations thereof. The expansion agent can be present in the tool cement composition in an amount of from about 0% BWOC to about 5% BWOC, alternatively from about 3 percent by weight of water (% BWOW) to about 10% BWOW.

The tool cement composition of the downhole tool can further comprise a defoamer. The most universal characteristic of a defoamer is that it is surface active, but highly insoluble in water. The surface-active nature and low water solubility of the defoamer cause it to spread very rapidly on any air-water interface it encounters. The defoamer can comprise a water-insoluble compound (WIC), a slightly water-soluble compound, or combinations thereof, wherein the slightly water-soluble compound can have less than about 10% solubility by weight in water. Hereinafter, for simplicity, the discussion will refer to the use of WICs although it is to be understood that slightly water-soluble compounds are also contemplated. The defoamer can comprise any WIC that is able to prevent and/or reduce the entrapment of air in a mixture to which it is introduced. The defoamer can comprise a silicon-containing liquid; an organosilane-containing liquid (e.g., a silicone oil); a hydrocarbon base fluid (e.g., an internal olefin, a straight-chain n-alcohol); a co-solvent (e.g., ethylene glycol, propylene glycol, ester-based fluids); glycerol tristearate; aliphatic hydrocarbons; a non-ionic surfactant; a hydrophobic particle selected from the group consisting of graphite, aluminum stearate, hydrophobically-modified clay; a mixture of glycerol tristearate and one or more aliphatic hydrocarbons selected from the group consisting of olefins having one or more internal double bonds and having 14 to 18 carbon atoms and a $C_{10}$ dimer of the formula as in Structure I below; or combinations thereof.

Structure I

In embodiments, the hydrocarbon base fluids can comprise straight-chain n-alcohols, such as 1-hexanol, 1-octanol, 1-decanol, or combinations thereof. In certain embodiments, the straight-chain n-alcohols include those having between four and ten carbons. In some embodiments, the defoamer can comprise a mixture of glycerol tristearate and one or more aliphatic hydrocarbons, for example one or more aliphatic hydrocarbons selected from the group consisting of olefins having one or more internal double bonds and having 14 to 18 carbon atoms and a $C_{10}$ dimer of the Structure I. The one or more aliphatic hydrocarbons may comprise a mixture of $C_{16}$ to $C_{18}$ olefins having internal double bonds or a mixture of $C_{14}$ to $C_{16}$ olefins having internal double bonds or a dimer having the formula set forth above. Generally, the weight ratio of the glycerol tristearate to the one or more aliphatic hydrocarbons utilized can be in the range of from about 5:95 to about 10:90.

The defoamer can be present in the tool cement composition in an amount of from about 0.1% BWOC to about 0.5% BWOC, alternatively from about 0.2% BWOC to about 0.4% BWOC, alternatively from about 0.2% BWOC to about 0.3% BWOC.

The tool cement composition of the downhole tool can further comprise one or more additives. The one or more additives can be included in the tool cement composition for improving or changing the properties thereof. These additives can be included singularly or in combination and in amounts effective to provide a user designated property of the tool cement composition. The one or more additives can comprise a salt, an accelerant, a set retarder, a fluid loss agent, a vitrified shale, a lost circulation material, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, or combinations thereof. The one or more additives can be present in the tool cement composition in an amount of from about 0% BWOC to about 5% BWOC, alternatively from about 0.01% BWOC to about 4% BWOC, alternatively from about 0.1% BWOC to about 3% BWOC.

In the downhole tool as disclosed herein, the annular seal provided by the set tool cement composition can have a fluid leakage of less than 750 ml over 15 minutes at a pressure of 7500 psi and a temperature of 400° F., alternatively less than 750 ml over 5 minutes at a pressure of 8000 psi and a temperature of 400° F., alternatively less than 750 ml over 5 minutes at a pressure of 8500 psi and a temperature of 400° F., alternatively less than 750 ml over 15 minutes at a pressure of 9000 psi and a temperature of 400° F. This leakage rate can meet and exceed the requirement in the API 10F Specification for float equipment released in July, 2018, wherein the float equipment has to hold back pressure of 7500 psi at 400° F. with a maximum fluid leakage of 750 ml over 15 minutes.

The tool cement composition can have a density of from about 14 pounds per gallon (lb/gal) to about 23 lb/gal, alternatively from about 16 lb/gal to about 21 lb/gal, alternatively from about 18 lb/gal to about 19 lb/gal.

The tool cement composition can have a curing time of from about 12 hours to about 168 hours, alternatively from about 12 hours to about 144 hours, alternatively from about 12 hours to about 120 hours. The strength of the tool cement composition can increase during curing.

In some embodiments of the downhole tool as disclosed herein, the tool cement composition has a composition, wherein: the cement comprises ASTM type II Portland cement; the sand has a particle size of equal to or greater than about 0.0165 inches (40 mesh) and equal to or less than about 0.0331 inches (20 mesh) and is present in an amount of from about 60% to about 80% BWOC; the silicon-containing material comprises silica flour having a particle size of equal to or less than about 0.0029 inches (200 mesh) and is present in an amount of from about 20% to about 40% BWOC; the dispersant is present in an amount of from about 0.7% to about 1.0% BWOC; the water is fresh water and is present in an amount of from about 30% to about 40% BWOC; optionally further comprising MgO as an expansion agent in an amount of from about 2.5% to about 5% BWOC; and optionally further comprising a defoamer in an amount of from about 0.1% to about 0.5% BWOC.

In some other embodiments of the downhole tool as disclosed herein, the tool cement composition has a composition, wherein: the cement comprises ASTM type II Portland cement; the sand has a particle size of equal to or greater than about 0.0165 inches (40 mesh) and equal to or less than about 0.0331 inches (20 mesh) and is present in an amount of from about 60% to about 80% BWOC; the silicon-containing material comprises silica flour having a particle size of equal to or less than about 0.0029 inches (200 mesh) and is present in an amount of from about 20% to about 40% BWOC; the dispersant is present in an amount of from about 0.7% to about 1.5% BWOC; the water is fresh water and is present in an amount of from about 30% to about 40% BWOC; optionally further comprising KCl as an expansion agent in an amount of from about 3% to about 10% BWOC; and optionally further comprising a defoamer in an amount of from about 0.1% to about 0.5% BWOC.

Disclosed herein is a method of making a downhole tool, comprising: disposing a sleeve inside a cylindrical housing to form an annular space between an outer surface of the sleeve and an inner surface of the cylindrical housing; placing (e.g., injecting, gravity filled) a tool cement composition of the type disclosed herein in the annular space, wherein the tool cement composition comprises a cement, sand, a silicon-containing material, a dispersant, and water; and allowing the tool cement composition to cure to form an annular seal between the outer surface of the sleeve and the inner surface of the cylindrical housing, wherein the annular seal has a fluid leakage of less than 750 ml per 15 minutes at a pressure of 7500 psi and a temperature of 400° F. Before placing the tool cement composition in the annular space, the components of the tool cement composition can be placed in a container and blended until the tool cement composition becomes a homogeneous flowable fluid or slurry. The container can be any container that is compatible with the tool cement composition and has sufficient space for the tool cement composition. A blender can be used for blending the tool cement composition.

The tool cement composition can further comprise an expansion agent. When the tool cement composition comprises an expansion agent, the expansion agent may react with water to form a product to perform expansion function; therefore allowing the tool cement composition to cure can comprise keeping the tool under water during curing. The water that reacts with the expansion agent can be the water in the tool cement composition or the water surrounding the tool. The water surrounding the tool can be freshwater, seawater, salt water, brine, or combinations thereof.

After being made according to the above method, the downhole tool can be used with segments of casing (e.g., a casing pipe) in a casing string that is cemented into a wellbore. First, the tool is attached or coupled to one or more casing pipes (e.g., the segments of casing combined to form the casing string), for example by threads. Multiple casing pipes can be connected to form the casing string. The casing string and the tool are lowered downhole in a wellbore. During the lowering of the casing string and the tool, the one way valve of the tool can be held at least partially open by a holding block (e.g., a bead) so that the existing fluid in the wellbore can flow upward through the tool and the casing string, which reduces the upward pressure to the casing string and thus allows the lowering of the casing string into the wellbore. Once the casing string and the tool are in place in the wellbore, a wellbore servicing fluid, for example a wellbore cement composition (e.g., a pumpable fluid or slurry) can be pumped downhole via the casing string and the tool. Once the wellbore cement composition flows through the one way valve in the tool, the holding block is released and will not hold the valve open any more, thus the valve will only allow downward flow from then on. The wellbore cement composition can flow out of the lower end of the casing string and the tool, and fill the space below the casing string and the tool. The wellbore cement composition can further fill at least a portion of the annular space between the casing string and the wellbore wall. Next, a displacement fluid can be pumped down the casing string and the tool to displace at least a portion of the wellbore cement composition in the casing string and out the one way valve and into the space below the casing string, and can further push the wellbore cement composition into the annular space between the casing string and the wellbore wall. Then the surface pressure can be released (no more fluid is pumped down), allowing the one way valve to close. At this point, the tool acts as a barrier to hold the differential pressure above and below the tool. The set tool cement composition in the tool and the one way valve both hold the differential pressure, so that the wellbore cement composition in the annular space between the casing string and the wellbore wall does not flow back into the casing string. The wellbore cement composition will cure and cement the casing string in place. The tool disclosed herein can be a float shoe, a float collar, a landing collar, or other float equipment used in running and cementing casing in a wellbore, depending on specific applications.

Disclosed herein is a method of servicing a wellbore penetrating a subterranean formation, comprising: running casing coupled to a tool into the wellbore, wherein the tool comprises: a cylindrical housing; a sleeve disposed with the cylindrical housing, forming an annular space between the sleeve and the cylindrical housing; and a tool cement composition disposed in the annular space, wherein prior to setting the tool cement composition comprises a cement, sand, a silicon-containing material, a dispersant, and water, and wherein upon setting the tool cement composition provides an annular seal having a fluid leakage of less than 750 ml per 15 minutes at a pressure of 7500 psi and a temperature of 400° F.; and placing a wellbore cement composition into all or a portion of an annular space formed between the casing and the wellbore. The tool can be a float shoe, a float collar, or a landing collar.

The method as disclosed herein has various advantages. Current float equipment can only hold pressure up to 5000 psi at 400° F. When current float equipment is used with casing in a cement casing operation, and when the differential pressure above and below the current float equipment exceeds 5000 psi, a wellbore cement composition may flow upward through the current float equipment, which is undesired in the cement casing operation. Also the API 10F Specification Revision 4 released in July, 2018 requires float equipment to hold pressure of 7500 psi at 400° F. with a maximum fluid leakage of 750 ml over 15 minutes, and the tool as disclosed herein can meet and exceed this requirement. The formulation of the tool cement composition of the tool prevents the tool cement composition from shrinking even at high temperature (up to 400° F.) and high pressure (up to 9000 psi), so that the tool can be used at high temperature and high pressure with minimum leakage (less than 750 ml per 15 minutes). The high pressure rating of the tool allows it to follow API 10F Specification Revision 4, and be applicable in operations that have high pressure difference above and below the tool, which can be caused by large weight of wellbore cement composition held by the tool, wherein the wellbore cement composition can be in the annular space between the casing and the wellbore wall.

In addition, the downhole tool disclosed herein does not need to have any sealing materials, i.e. rubber compound, o-ring, or other pre-mold seals, on the interface between the cement body and the cylindrical housing, or on the interface between the cement body and the sleeve; and the downhole tool does not need to use a metal or plastic reinforced plate with o-ring on the bottom side of the downhole tool to seal and hold pressure. These bring benefits of lower production cost, higher reliability, and faster to be drilled out. For example, the downhole tool disclosed herein can be easily drilled out with a polycrystalline diamond compact (PDC) drill bit after the cementing operation is completed and the wellbore cement composition is fully cured.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Four different formulations that can make a tool cement composition are given in Tables 1, 2, 3, and 4 as follows.

TABLE 1

Formulation of tool cement composition for float equipment for high pressure ad high temperature application

| | |
|---|---|
| ASTM Type II Cement | 100% BWOC |
| 20/40 mesh Sand | 79.80% BWOC |
| 200 mesh Silica Flour | 26.60% BWOC |
| MgO | 5.00% BWOW |
| Dispersant | 0.70% BWOC |
| Defoamer | 0.27% BWOC |
| Water | 35.27% BWOC |

TABLE 2

Formulation of tool cement composition for float equipment for high pressure ad high temperature application

| | |
|---|---|
| ASTM Type II Cement | 100% BWOC |
| 20/40 mesh Sand | 79.80% BWOC |
| 200 mesh Silica Flour | 26.60% BWOC |
| KCl | 3.00% BWOW |
| Dispersant | 1.10% BWOC |
| Defoamer | 0.27% BWOC |
| Water | 34% BWOC |

TABLE 3

Formulation of tool cement composition for float equipment for high pressure and high temperature application

| | |
|---|---|
| ASTM Type II Cement | 100% BWOC |
| 20/40 mesh Sand | 106.40% BWOC |
| Dispersant | 0.70% BWOC |
| Defoamer | 0.27% BWOC |
| Water | 29.80% BWOC |

TABLE 4

Formulation of tool cement composition for float equipment for high pressure and high temperature application

| | |
|---|---|
| ASTM Type II Cement | 100% BWOC |
| 20/40 mesh Sand | 79.79% BWOC |
| 200 mesh Silica Flour | 26.60% BWOC |
| Dispersant | 0.90% BWOC |
| Defoamer | 0.27% BWOC |
| Water | 31.80% BWOC |

Figure 4:
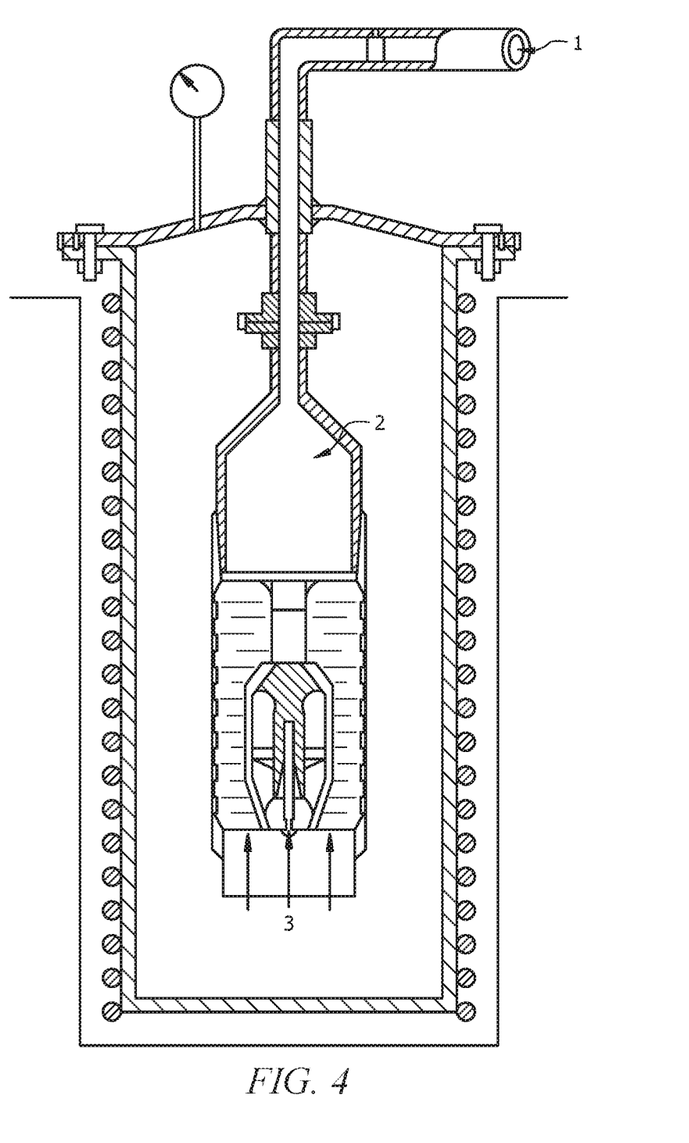
FIG. 4 shows the apparatus for a high temperature and high pressure test.
Figure 5:
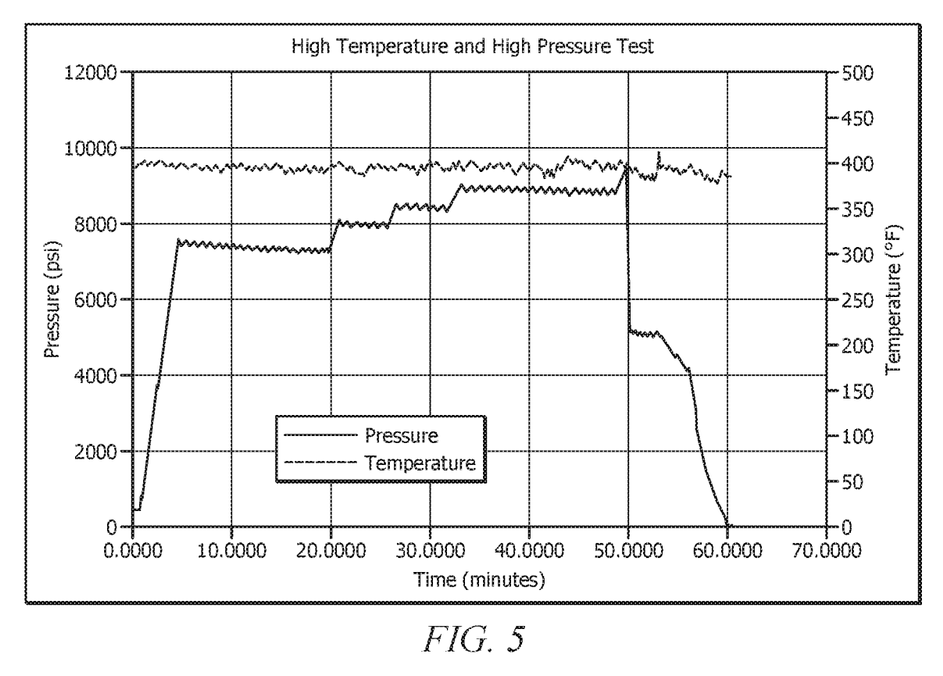
FIG. 5 shows the results from a high temperature and high pressure test.

A 9⅝-inch float collar, as shown in FIG. 1, with a one way valve suspended inside the cylindrical housing using a tool cement composition described in Table 4, was submerged in a UCON™ 500 heat transfer fluid at 400° F. for 8 hours inside a pressure vessel as shown in FIG. 4. The space at location number 2 is connected to atmosphere pressure, location number 3 is the pressure of the vessel, and location number 1 is where the leak will be measured if there is any. The submersion was to ensure that the float collar has uniform thermal profile throughout. Upon 8 hours submersion, the float collar was pressure tested and held at 7500 psi for 15 minutes, 8000 psi for 5 minutes, 8500 psi for 5 minutes, and 9000 psi for 15 minutes. At each of the pressure steps, there was no leakage detected at location number 1 and the pressure was stable through the test within ±300 psi. The results are shown in FIG. 5.

Figure 8:
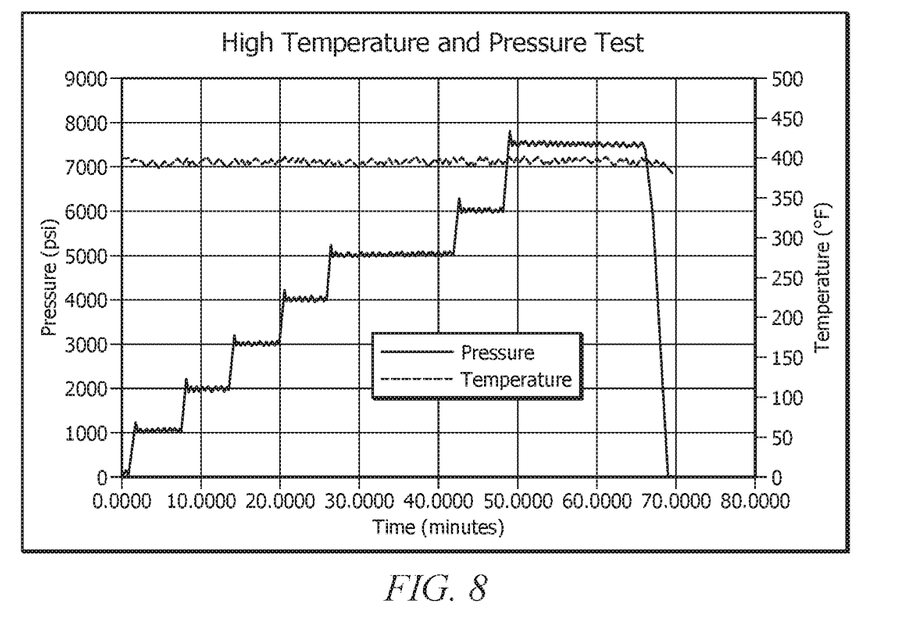
FIG. 8 shows the results from a high temperature and high pressure test.

Similar test was conducted with a 7-inch float collar, as shown in FIG. 1, with a one way valve suspended inside the cylindrical housing using a tool cement composition described in Table 1, was submerged in a UCON™ 500 heat transfer fluid at 400° F. for 8 hours inside a pressure vessel as shown in FIG. 4. Upon 8 hours submersion, the float collar was pressure tested and held at 1000 psi for 5 minutes, 2000 psi for 5 minutes, 3000 psi for 5 minutes, 4000 psi for 5 minutes, 5000 psi for 15 minutes, 6000 psi for 5 minutes, and 7500 psi for 18 minutes. At each of the pressure steps, there was no leakage detected at location number 1 and the pressure was stable through the test within ±300 psi. The results are shown in FIG. 8.

Figure 9:
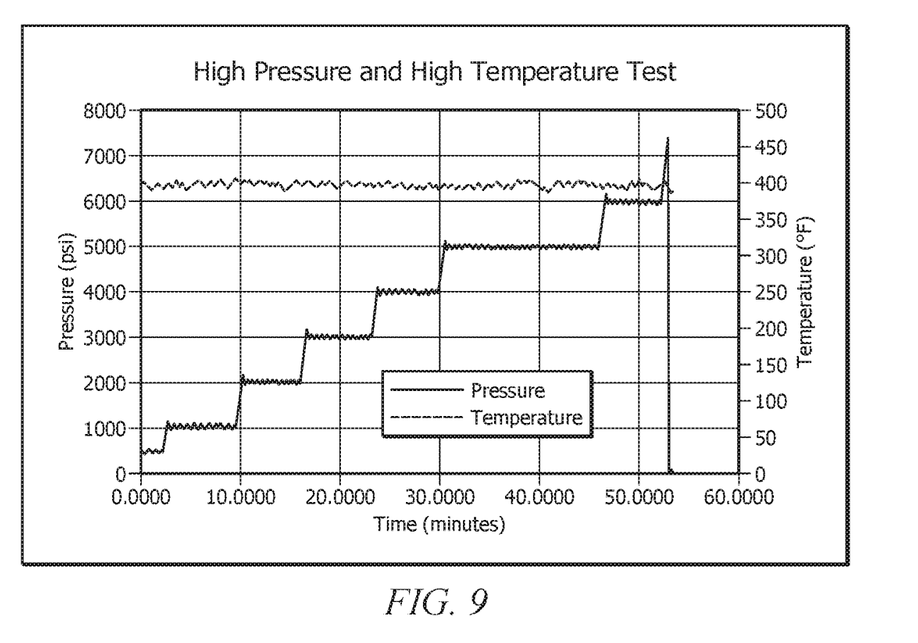
FIG. 9 shows the results from a high temperature and high pressure test.

Similar test was conducted with a 9⅝-inch float collar, as shown in FIG. 1, with a one way valve suspended inside the cylindrical housing using a tool cement composition described in Table 1, was submerged in a UCON™ 500 heat transfer fluid at 400° F. for 8 hours inside a pressure vessel as shown in FIG. 4. Upon 8 hours submersion, the float collar was pressure tested and held at 1000 psi for 5 minutes, 2000 psi for 5 minutes, 3000 psi for 5 minutes, 4000 psi for 5 minutes, 5000 psi for 15 minutes, and 6000 psi for 5 minutes. At the end of the 6000 psi test, 408 grams of UCON™ 500 was detected at location number 1 and the pressure was stable through the test within ±300 psi. The float collar failed and lost pressure at 7200 psi. The results are shown in FIG. 9.

Figure 10:
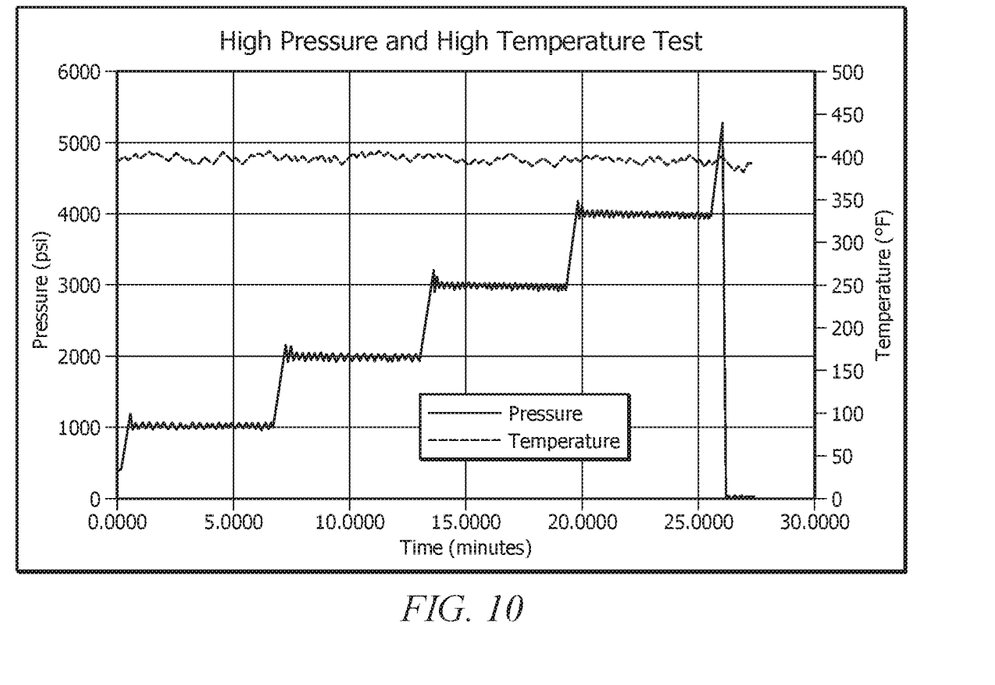
FIG. 10 shows the results from a high temperature and high pressure test.

Similar test was conducted with a 9⅝-inch float collar, as shown in FIG. 1, with a one way valve suspended inside the cylindrical housing using a tool cement composition described in Table 3, was submerged in a UCON™ 500 heat transfer fluid at 400° F. for 8 hours inside a pressure vessel as shown in FIG. 4. Upon 8 hours submersion, the float collar was pressure tested and held at 1000 psi for 5 minutes, 2000 psi for 5 minutes, 3000 psi for 5 minutes, and 4000 psi for 5 minutes. The pressure was stable through the test within ±300 psi. The float collar failed and lost pressure at 5210 psi. The results are shown in FIG. 10.

Example 2

Figure 6:
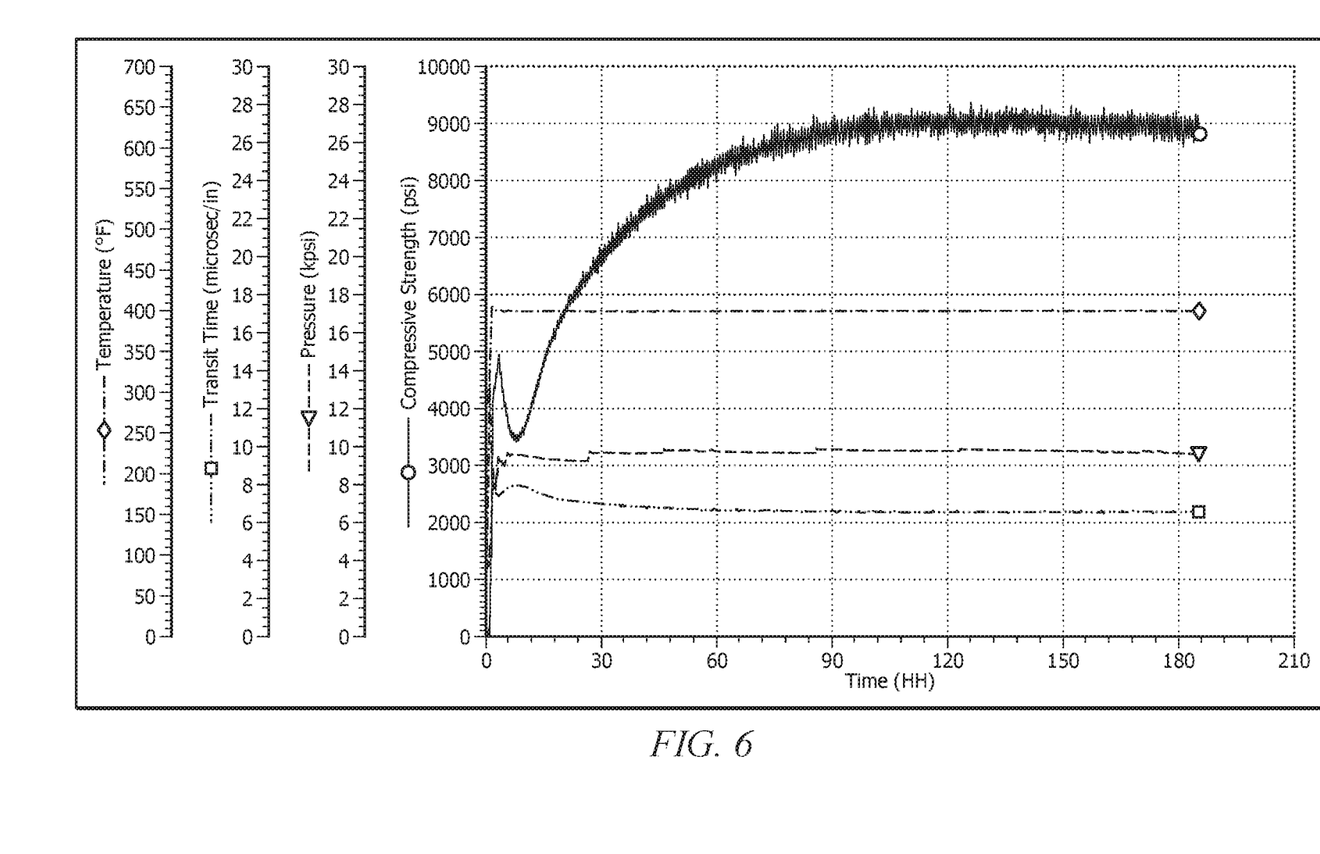
FIG. 6 shows the UCA (ultrasonic cement analyzer) chart of the formulation of a tool cement composition.
Figure 7:
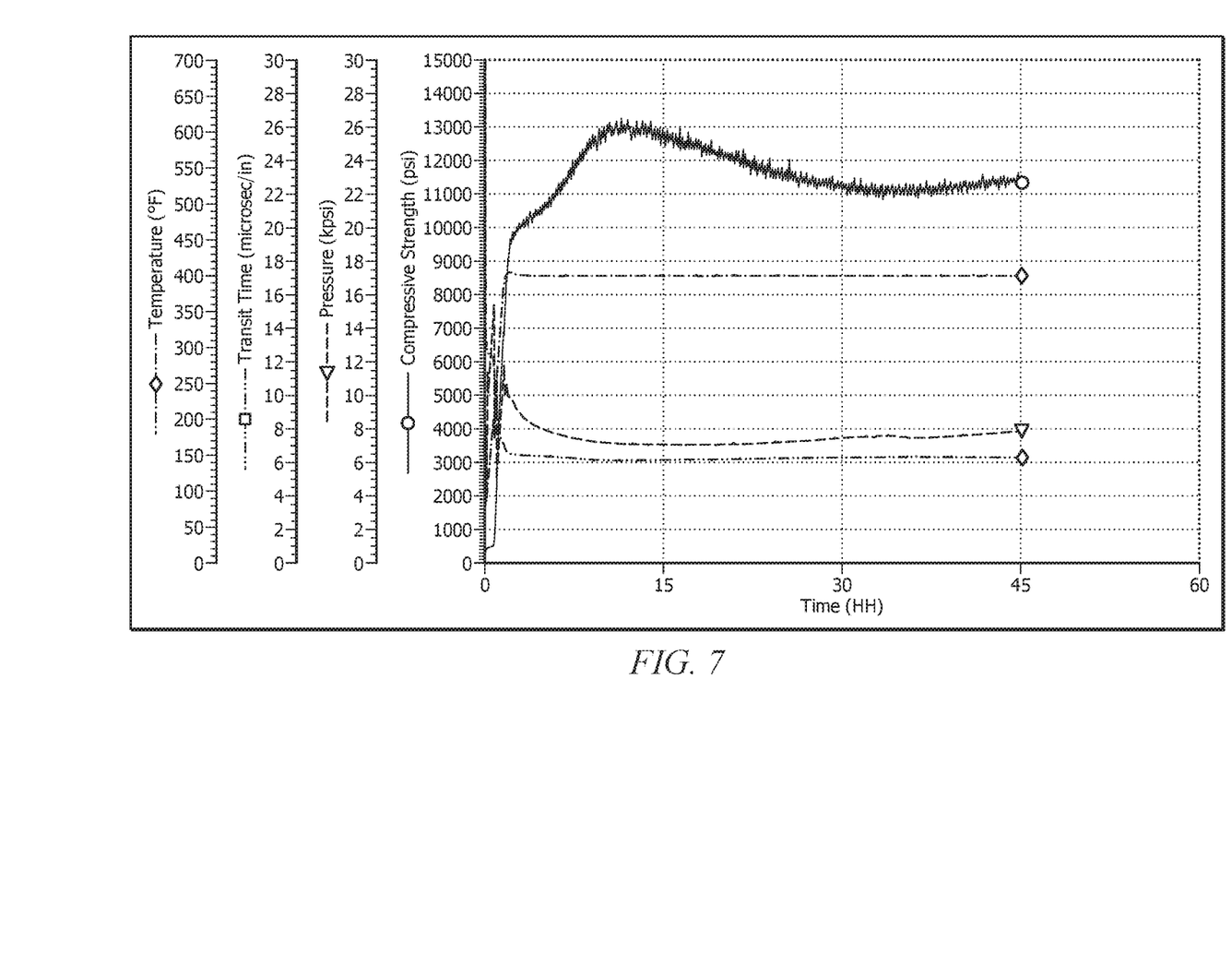
FIG. 7 shows the UCA (ultrasonic cement analyzer) chart of the formulation of a tool cement composition.

The tool cement compositions were evaluated for strength retrogression using an ultrasonic cement analyzer (UCA). The UCA measures the speed or transit time of an acoustic pulse through the cement sample and correlates this to compressive strength. The UCA chart of the formulation in Table 3 is shown in FIG. 6. The tool cement composition described in Table 3 experienced an increase in the transit time of the acoustic pulse indicating a reduction in strength with a minima occurring between 5 and 10 hours. The large particle size of the 20/40 mesh sand does not stabilize strength initially, but transit time stabilizes after about 10 hours and correlates to a compressive strength of 9000 psi. The UCA chart of the formulation in Table 4 is shown in FIG. 7. Comparing with Table 3, about 25% of the 20/40 mesh sand is replaced with silica flour in the formulation in Table 4. The addition of silica flour to the tool cement composition reduces the magnitude of strength retrogression, and a minima is not observed between 5 and 10 hours. The set tool cement composition builds and maintains strength as measured by UCA above 10000 psi after about 3 hours.

ADDITIONAL DISCLOSURE

The following are non-limiting, specific embodiments in accordance with the present disclosure:

A first embodiment, which is a downhole tool comprising a cylindrical housing, a sleeve disposed in the cylindrical housing, forming an annular space between the sleeve and the cylindrical housing, and a tool cement composition disposed in the annular space, wherein prior to setting the tool cement composition comprises a cement, sand, a silicon-containing material, a dispersant, and water, and wherein upon setting the tool cement composition provides an annular seal having a fluid leakage of less than 750 ml over 15 minutes at a pressure of 7500 psi and a temperature of 400° F.

A second embodiment, which is the tool of the first embodiment, wherein the cylindrical housing comprises steel.

A third embodiment, which is the tool of the first or the second embodiment, wherein one or both ends of the cylindrical housing are each coupled to a casing pipe.

A fourth embodiment, which is the tool of the third embodiment, wherein the one or two casing pipes have sizes from about 4½ inches to about 22 inches, alternatively from about 4½ inches to about 16 inches, alternatively from about 4½ inches to about 9⅝ inches.

A fifth embodiment, which is the tool of any of the first through the fourth embodiments, wherein the inner surface of the cylindrical housing comprises one or more ribs, wedges, indentations, or combinations thereof that aid resistance to axial movement of the annular seal.

A sixth embodiment, which is the tool of any of the first through the fifth embodiments, wherein the sleeve comprises a valve.

A seventh embodiment, which is the tool of the sixth embodiment, wherein the valve is a one-way valve which permits flow in a single direction.

An eighth embodiment, which is the tool of the seventh embodiment, wherein the single direction is from top to bottom or from an interior of the tool to an exterior of the tool.

A ninth embodiment, which is the tool of any of the first through the eighth embodiments, wherein the cement comprises ASTM type II cement.

A tenth embodiment, which is the tool of any of the first through the eighth embodiments, wherein the cement comprises calcium, iron, aluminum, silicon, oxygen, hydrogen, sulfur, or combinations thereof.

An eleventh embodiment, which is the tool of any of the first through the eighth embodiments, wherein the cement comprises Portland cement, pozzolana cement, gypsum cement, shale cement, acid/base cement, phosphate cement, high alumina content cement, slag cement, silica cement, high alkalinity cement, magnesia cement, or combinations thereof.

A twelfth embodiment, which is the tool of any of the first through the eleventh embodiments, wherein the cement is present in the tool cement composition in an amount 100 percent by weight of cement (% BWOC).

A thirteenth embodiment, which is the tool of any of the first through the twelfth embodiments, wherein the sand comprises a naturally-occurring sand, a quartz sand, a glass sand, or combinations thereof.

A fourteenth embodiment, which is the tool of any of the first through the thirteenth embodiments, wherein the sand has a particle size of equal to or greater than about 0.0070 inches (80 mesh) and equal to or less than about 0.0331 inches (20 mesh).

A fifteen embodiment, which is the tool of any of the first through the fourteenth embodiments, wherein the sand is present in the tool cement composition in an amount of from about 60% BWOC to about 80% BWOC, alternatively from about 65% BWOC to about 80% BWOC, alternatively from about 70% BWOC to about 80% BWOC.

A sixteenth embodiment, which is the tool of any of the first through the fifteenth embodiments, wherein the silicon-containing material comprises silica flour, silica fume, fumed silica, micro fine silica, fly ash, pozzolan, zeolites, volcanic glass, powdered glass, perlite, pumice, natural glasses, synthetic glasses, metakaolin, or combinations thereof.

A seventeenth embodiment, which is the tool of any of the first through the sixteenth embodiments, wherein the silicon-containing material has a particle size of equal to or less than about 0.0035 inches (170 mesh), alternatively of equal to or less than about 0.0029 inches (200 mesh).

An eighteenth embodiment, which is the tool of any of the first through the seventeenth embodiments, wherein the silicon-containing material is present in the tool cement composition in an amount of from about 20% BWOC to about 40% BWOC, alternatively from about 20% BWOC to about 30% BWOC, alternatively from about 25% BWOC to about 30% BWOC.

A nineteenth embodiment, which is the tool of any of the first through the eighteenth embodiments, wherein the dispersant comprises sulfonated acetone formaldehyde condensate, naphthalene sulfonate, sodium naphthalene sulfonate, sodium acid pyrophosphate (SAPP), ammonium lignosulfonate salt, metal lignosulfonate salts, phosphates, polyphosphates, organophosphates, phosphonates, tannins, leonardite, polyacrylates having a molecular weight less than about 10,000, or combinations thereof.

A twentieth embodiment, which is the tool of any of the first through the nineteenth embodiments, wherein the dispersant is present in the tool cement composition in an amount of from about 0.7% BWOC to about 1.5% BWOC, alternatively from about 0.7% BWOC to about 1.1% BWOC, alternatively from about 0.8% BWOC to about 1% BWOC.

A twenty-first embodiment, which is the tool of any of the first through the twentieth embodiments, wherein the water comprises water selected from the group consisting of freshwater, saltwater, brine, seawater, and combinations thereof.

A twenty-second embodiment, which is the tool of any of the first through the twenty-first embodiments, wherein the water is present in the tool cement composition in an amount of from about 30% BWOC to about 40% BWOC, alternatively from about 32% BWOC to about 38% BWOC, alternatively from about 34% BWOC to about 36% BWOC.

A twenty-third embodiment, which is the tool of any of the first through the twenty-second embodiments, wherein the tool cement composition further comprises an expansion agent.

A twenty-fourth embodiment, which is the tool of the twenty-third embodiment, wherein the expansion agent comprises calcium aluminate, calcium sulfate, calcium sulfate hemihydrate, calcium sulfate dehydrate, high tricalcium aluminate Portland cement, magnesium oxide, potassium chloride, sodium chloride, potassium hydroxide, or combinations thereof.

A twenty-fifth embodiment, which is the tool of any of the twenty-third through the twenty-fourth embodiments, wherein the expansion agent is present in the tool cement composition in an amount of from about 0% BWOC to about 5% BWOC, alternatively from about 3 percent by weight of water (% BWOW) to about 10% BWOW.

A twenty-sixth embodiment, which is the tool of any of the first through the twenty-fifth embodiments, wherein the tool cement composition further comprises a defoamer.

A twenty-seventh embodiment, which is the tool of the twenty-sixth embodiment, wherein the defoamer comprises a water-insoluble compound (WIC), a slightly water-soluble compound, or combinations thereof, wherein the slightly water-soluble compound has less than about 10% solubility by weight in water.

A twenty-eighth embodiment, which is the tool of the twenty-sixth embodiment, wherein the defoamer comprises a silicon-containing liquid; an organosilane-containing liquid; a hydrocarbon base fluid; a co-solvent; glycerol tristearate; aliphatic hydrocarbons; a non-ionic surfactant; a hydrophobic particle selected from the group consisting of graphite, aluminum stearate, and hydrophobically-modified clay; a mixture of glycerol tristearate and one or more aliphatic hydrocarbons selected from the group consisting of olefins having one or more internal double bonds and having 14 to 18 carbon atoms and a $C_{10}$ dimer of the formula below; or combinations thereof.

A twenty-ninth embodiment, which is the tool of any of the twenty-sixth through the twenty-eighth embodiments, wherein the defoamer is present in the tool cement composition in an amount of from about 0.1% BWOC to about 0.5% BWOC, alternatively from about 0.2% BWOC to about 0.4% BWOC, alternatively from about 0.2% BWOC to about 0.3% BWOC.

A thirtieth embodiment, which is the tool of any of the first through the twenty-ninth embodiments, wherein the tool cement composition further comprises one or more additives.

A thirty-first embodiment, which is the tool of the thirtieth embodiment, wherein the one or more additives comprise a salt, an accelerant, a set retarder, a fluid loss agent, a vitrified shale, a lost circulation material, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, or combinations thereof.

A thirty-second embodiment, which is the tool of the thirtieth or the thirty-first embodiment, wherein the one or more additives are present in the tool cement composition in an amount of from about 0% BWOC to about 5% BWOC, alternatively from about 0.01% BWOC to about 4% BWOC, alternatively from about 0.1% BWOC to about 3% BWOC.

A thirty-third embodiment, which is the tool of any of the first through the thirty-second embodiments, wherein the annular seal has a fluid leakage of less than 750 ml over 5 minutes at a pressure of 8000 psi and a temperature of 400° F.

A thirty-fourth embodiment, which is the tool of any of the first through the thirty-third embodiments, wherein the annular seal has a fluid leakage of less than 750 ml over 5 minutes at a pressure of 8500 psi and a temperature of 400° F.

A thirty-fifth embodiment, which is the tool of any of the first through the thirty-fourth embodiments, wherein the annular seal has a fluid leakage of less than 750 ml over 15 minutes at a pressure of 9000 psi and a temperature of 400° F.

A thirty-sixth embodiment, which is the tool of any of the first through the thirty-fifth embodiments, wherein the tool cement composition has a density of from about 14 pounds per gallon (lb/gal) to about 23 lb/gal, alternatively from about 16 lb/gal to about 21 lb/gal, alternatively from about 18 lb/gal to about 19 lb/gal.

A thirty-seventh embodiment, which is the tool of any of the first through the thirty-sixth embodiments, wherein the tool cement composition has a curing time of from about 12 hours to about 168 hours, alternatively from about 12 hours to about 144 hours, alternatively from about 12 hours to about 120 hours.

A thirty-eighth embodiment, which is the tool of any of the first through the thirty-seventh embodiments, wherein the cement comprises ASTM type II Portland cement, the sand has a particle size of equal to or greater than about 0.0165 inches (40 mesh) and equal to or less than about 0.0331 inches (20 mesh) and is present in an amount of from about 60% to about 80% BWOC, the silicon-containing material comprises silica flour having a particle size of equal to or less than about 0.0029 inches (200 mesh) and is present in an amount of from about 20% to about 40% BWOC, the dispersant is present in an amount of from about 0.7% to about 1.0% BWOC, the water is fresh water and is present in an amount of from about 30% to about 40% BWOC, optionally further comprising MgO as an expansion agent in an amount of from about 2.5% to about 5% BWOC, and optionally further comprising a defoamer in an amount of from about 0.1% to about 0.5% BWOC.

A thirty-ninth embodiment, which is the tool of any of the first through the thirty-seventh embodiments, wherein the cement comprises ASTM type II Portland cement, the sand has a particle size of equal to or greater than about 0.0165 inches (40 mesh) and equal to or less than about 0.0331 inches (20 mesh) and is present in an amount of from about 60% to about 80% BWOC, the silicon-containing material comprises silica flour having a particle size of equal to or less than about 0.0029 inches (200 mesh) and is present in an amount of from about 20% to about 40% BWOC, the dispersant is present in an amount of from about 0.7% to about 1.5% BWOC, the water is fresh water and is present in an amount of from about 30% to about 40% BWOC, optionally further comprising KCl as an expansion agent in an amount of from about 3% to about 10% BWOC, and optionally further comprising a defoamer in an amount of from about 0.1% to about 0.5% BWOC.

A fortieth embodiment, which is a method of making a downhole tool, comprising disposing a sleeve inside a cylindrical housing to form an annular space between the sleeve and the cylindrical housing, placing a tool cement composition in the annular space, wherein the tool cement composition comprises a cement, sand, a silicon-containing material, a dispersant, and water, and allowing the tool cement composition to cure to form an annular seal between an outer surface of the sleeve and an inner surface of the cylindrical housing, wherein the annular seal has a fluid leakage of less than 750 ml per 15 minutes at a pressure of 7500 psi and a temperature of 400° F.

A forty-first embodiment, which is the method of the fortieth embodiment, wherein the tool cement composition further comprises an expansion agent.

A forty-second embodiment, which is the method of the forty-first embodiment, wherein allowing the tool cement composition to cure comprises keeping the tool under water during curing.

A forty-third embodiment, which is a method of servicing a wellbore penetrating a subterranean formation, comprising: running casing coupled to a tool into the wellbore, wherein the tool comprises a cylindrical housing, a sleeve disposed with the cylindrical housing, forming an annular space between the sleeve and the cylindrical housing, and a tool cement composition disposed in the annular space, wherein prior to setting the tool cement composition comprises a cement, sand, a silicon-containing material, a dispersant, and water, and wherein upon setting the tool cement composition provides an annular seal having a fluid leakage of less than 750 ml per 15 minutes at a pressure of 7500 psi and a temperature of 400° F., and placing a wellbore cement composition into all or a portion of an annular space formed between the casing and the wellbore.

A forty-fourth embodiment, which is the method of the forty-third embodiment, wherein the tool is a float shoe, a float collar, or a landing collar.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A downhole tool comprising:
   a cylindrical housing;

a sleeve disposed in the cylindrical housing, forming an annular space between the sleeve and the cylindrical housing; and a tool cement composition disposed in the annular space, wherein prior to setting the tool cement composition comprises a cement, sand, silica flour, a dispersant, and water, and wherein upon setting the tool cement composition provides an annular seal having a fluid leakage of less than 750 ml over 15 minutes at a pressure of 7500 psi and a temperature of 400° F.

2. The tool of claim 1, wherein the inner surface of the cylindrical housing comprises one or more ribs, wedges, indentations, or combinations thereof that aid resistance to axial movement of the annular seal.

3. The tool of claim 1, wherein the sleeve comprises a valve.

4. The tool of claim 3, wherein the valve is a one-way valve which permits flow in a single direction.

5. The tool of claim 1, wherein the cement comprises Portland cement, pozzolana cement, gypsum cement, shale cement, acid/base cement, phosphate cement, high alumina content cement, slag cement, silica cement, high alkalinity cement, magnesia cement, or combinations thereof.

6. The tool of claim 1, wherein the sand has a particle size of equal to or greater than about 0.0070 inches (80 mesh) and equal to or less than about 0.0331 inches (20 mesh).

7. The tool of claim 1, wherein the sand is present in the tool cement composition in an amount of from about 60% BWOC to about 80% BWOC, alternatively from about 65% BWOC to about 80% BWOC, alternatively from about 70% BWOC to about 80% BWOC.

8. The tool of claim 1, wherein the silica flour has a particle size of equal to or less than about 0.0035 inches (170 mesh).

9. The tool of claim 1, wherein the silica flour is present in the tool cement composition in an amount of from about 20% BWOC to about 40% BWOC, alternatively from about 20% BWOC to about 30% BWOC, alternatively from about 25% BWOC to about 30% BWOC.

10. The tool of claim 1, wherein the dispersant comprises sulfonated acetone formaldehyde condensate, naphthalene sulfonate, sodium naphthalene sulfonate, sodium acid pyrophosphate (SAPP), ammonium lignosulfonate salt, metal lignosulfonate salts, phosphates, polyphosphates, organophosphates, phosphonates, tannins, leonardite, polyacrylates having a molecular weight less than about 10,000, or combinations thereof.

11. The tool of claim 1, wherein the dispersant is present in the tool cement composition in an amount of from about 0.7% BWOC to about 1.5% BWOC, alternatively from about 0.7% BWOC to about 1.1% BWOC, alternatively from about 0.8% BWOC to about 1% BWOC.

12. The tool of claim 1, wherein the water is present in the tool cement composition in an amount of from about 30% BWOC to about 40% BWOC, alternatively from about 32% BWOC to about 38% BWOC, alternatively from about 34% BWOC to about 36% BWOC.

13. The tool of claim 1, wherein the annular seal has a fluid leakage of less than 750 ml over 5 minutes at a pressure of 8000 psi and a temperature of 400° F.

14. The tool of claim 1, wherein the annular seal has a fluid leakage of less than 750 ml over 5 minutes at a pressure of 8500 psi and a temperature of 400° F.

15. The tool of claim 1, wherein the annular seal has a fluid leakage of less than 750 ml over 15 minutes at a pressure of 9000 psi and a temperature of 400° F.

16. The tool of claim 1, wherein the silica flour has a particle size of equal to or less than about about 0.0029 inches (200 mesh).

17. A method of making a downhole tool, comprising:
disposing a sleeve inside a cylindrical housing to form an annular space between the sleeve and the cylindrical housing;

placing a tool cement composition in the annular space, wherein the tool cement composition comprises a cement, sand, silica flour, a dispersant, and water; and allowing the tool cement composition to cure to form an annular seal between an outer surface of the sleeve and an inner surface of the cylindrical housing, wherein the annular seal has a fluid leakage of less than 750 ml per 15 minutes at a pressure of 7500 psi and a temperature of 400° F.

18. The method of claim 17, wherein allowing the tool cement composition to cure comprises keeping the tool under water during curing.

19. A method of servicing a wellbore penetrating a subterranean formation, comprising: running casing coupled to a tool into the wellbore, wherein the tool comprises:

a cylindrical housing;

a sleeve disposed with the cylindrical housing, forming an annular space between the sleeve and the cylindrical housing; and a tool cement composition disposed in the annular space, wherein prior to setting the tool cement composition comprises a cement, sand, silica flour, a dispersant, and water, and wherein upon setting the tool cement composition provides an annular seal having a fluid leakage of less than 750 ml per 15 minutes at a pressure of 7500 psi and a temperature of 400° F.; and placing a wellbore cement composition into all or a portion of an annular space formed between the casing and the wellbore.

20. The method of claim 19, wherein the tool is a float shoe, a float collar, or a landing collar.

* * * * *